United States Patent [19]
Souza

[11] Patent Number: 5,366,023
[45] Date of Patent: Nov. 22, 1994

[54] APPARATUS FOR RETRIEVING DRIP TAPE

[76] Inventor: Ronald H. Souza, 370 Silva Pl., Nipoma, Calif. 93444

[21] Appl. No.: 78,868

[22] Filed: Jun. 21, 1993

[51] Int. Cl.$^5$ .............................................. F16L 1/00
[52] U.S. Cl. ........................................ 171/10; 171/45; 171/62; 239/197; 405/180
[58] Field of Search .................... 171/10, 45, 62, 1; 405/181, 180, 174, 36, 154; 47/56, 1.01; 239/197; 172/10

[56] References Cited

U.S. PATENT DOCUMENTS

| Re. 34,488 | 12/1993 | Clark | 405/174 X |
|---|---|---|---|
| 3,175,621 | 3/1965 | Kappelmann et al. | 171/62 X |
| 3,559,414 | 2/1971 | Pike et al. | 405/181 |
| 3,866,532 | 2/1975 | Ogden, Jr. | 100/171 |
| 4,447,173 | 5/1984 | Schultz et al. | 405/181 |
| 4,461,598 | 7/1984 | Flechs | 405/181 |
| 4,796,711 | 1/1989 | Chrysler | 171/1 |
| 5,190,409 | 3/1993 | Hall | 405/174 X |
| 5,236,051 | 8/1993 | Sawyer et al. | 171/45 X |

FOREIGN PATENT DOCUMENTS 2399796 3/1979 France ................................. 171/1

Primary Examiner—Randolph A. Reese
Assistant Examiner—Christopher J. Novosad
Attorney, Agent, or Firm—Daniel C. McKown

[57] ABSTRACT

A wagon pulled along a plant bed for retrieving buried drip tape includes a cultivator disc for loosening the soil to free the drip tape which is then drawn upward and onto the wagon through the use of a rotating drum that rotates at such a speed that its surface moves at the ground speed of the wagon. A wringer wheel that bears against the drum extracts water and air from the drip tape, which is then wound onto a reel under the control of an operator for subsequent storage and reuse. This mode of retrieval is considerably faster than manual retrieval thereby reducing labor cost, and the reuse of the drip tape saves disposal costs as well as material costs and results in conservation resources of the resources used in manufacturing the drip tape.

1 Claim, 3 Drawing Sheets

APPARATUS FOR RETRIEVING DRIP TAPE

BACKGROUND OF THE INVENTION

1. Field of the Invention

The present invention is in the field of agricultural equipment and consists of a wagon that, when pulled by a tractor along one or more plant beds, loosens a buried or unburied drip tape from the soil, removes air and water from the drip tape, and winds the drip tape onto a reel for reuse or disposal.

2. The Prior Art

The type of drip irrigation tubing with which the present invention is concerned is a flexible tubular conduit of polyethylene plastic. It is available in wall thicknesses ranging from 4 to 15 mils, and is usually sold in reels that contain 6000 to 15,000 feet depending on the wall thickness. The tape has a circumference of 2.0 inches, so that when flattened it has a width of 1 inch. Tiny apertures spaced eight inches apart or more along the length of the tape permit pressurized water to drip from the conduit at a slow and predetermined rate.

Although a few users of the drip tape are content to leave it lying on the surface of the plant bed, most users prefer to bury the drip tape at depths of several inches. For a typical plant bed spacing, approximately 13,800 feet of drip tape are required to irrigate one acre. Since a large producer may have a 1,000 acres, it can be seen that millions of feet of drip tape will be involved.

Drip tape irrigation is routinely used in the production of celery, lettuce, broccoli, and cauliflower. Typically, these crops are planted on elevated beds that are approximately 22 inches across and that are approximately 38 inches from center-to-center. For celery, lettuce, and broccoli, normally two lines of plants are located near opposite sides of the bed. Usually a single line at the center of the bed is used for cauliflower. After the raised beds have been formed, the drip tape is buried at the center of the bed and the plants are then planted. The drip tape remains in place until the crop is harvested. After the harvest, the tape must be removed because it would be thrown out of position and damaged by subsequent cultivation of the soil. Thus, in locations where two or three crops per year are grown, the drip tape must be put in place and then removed as many times.

Prior to the present invention, it was common practice for a crew of workers to manually pull the drip tape from the soil and to roll it into loose bundles which were then loaded onto a vehicle and taken to a depot for disposal. Thus, each year many millions of feet of used drip tape were disposed of at a considerable cost that included both the cost of removing the tape from the soil and the cost of disposing of the removed tape. The used tape was considered to be unreusable, partly because of the manner in which it was bundled up.

The present invention overcomes this wasteful practice by permitting the recycling of drip tape, and in the process greatly lowers the cost of removing the drip tape from the soil.

In U.S. Pat. No. 4,447,173 issued May 8, 1984, Schultz et al. describe an apparatus useful for burying drip tape, but it is clear that the same apparatus cannot be used in reverse to remove the drip tape from the soil.

In French Patent No. 2,399,796 to Budzyn, published 9 March 1979, there is described a tractor attachment usable for rolling up an elongated sheet of plastic such as used in horticulture. The vehicle includes a blade that is continuously pushed forward under the plastic sheet to pick up the sheet, which is then wound onto a drum that is turned by the ground-contacting wheels.

In U.S. Pat. No. 4,796,711 issued Jan. 10, 1989, Chrysler describes a similar apparatus for removing sheets of plastic film from raised plant beds.

The problem solved by Budzyn and by Chrysler is in some ways simpler than that which faced the present inventor. For example, the sheet of plastic film recovered by the apparatus of Budzyn or of Chrysler is not buried beneath several inches of soil, although some soil is used at the lateral edges to prevent the wind from picking up the film. Also, the sheet of plastic recovered by the apparatus of Budzyn or of Chrysler consists of a single layer and thus does not contain water or air, both of which complicate the recovery of drip tape.

In U.S. Pat. No. 3,866,532 issued Feb. 18, 1975, Ogden, Jr. describes a firehose retractor for removing trapped water and air from firehoses. The firehose is drawn through a wringer which also includes brushes that remove small stones and other debris from the outside of the firehose. Although the firehose retractor could, conceivably, be used while the fire engine is in motion, there is no provision for matching the speed of the rollers of the wringer with the groundspeed of the fire engine. This aspect of the problem is dealt with in a different and simpler manner in the present invention.

Thus, the prior art does not disclose an apparatus that could be used to solve the problem which the present inventor set out to solve, namely, to recover buried drip tape from the soil and to wind it onto reels in a smooth manner so that the plastic drip tape can be reused.

SUMMARY OF THE INVENTION

The apparatus of the present invention makes possible the retrieval of millions of feet of plastic drip tape each year and permits the recovered tape to be reused a number of times. This results in an important conservation of plastic, as well as huge savings in the cost of the drip tape. Further, the speed of the apparatus is so great that the cost of removing the drip tape from the soil is greatly reduced, and disposal costs are slashed.

In a recent test of the present invention, three men— one on the tractor and two in the wagon—were able to remove 13,800 feet of drip tape from an acre in 45 minutes.

These highly desirable results flow from the structural design of the apparatus, which will be described in greater detail below.

The apparatus includes a tractor-drawn wagon having a cultivator disc strategically placed at approximately the same depth as the drip tape but to one side of it, to loosen the soil adjacent the buried drip tape, thereby facilitating removal of the buried drip tape from the soil. As the wagon is pulled by the tractor along a plant bed, the drip tape is passed in a continuous motion through a wringer that removes trapped water and air from the drip tape. The drip tape then passes to a powered revolving reel on which the drip tape is smoothly wound. The resulting wound reels are then ready for storage and subsequent reuse.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
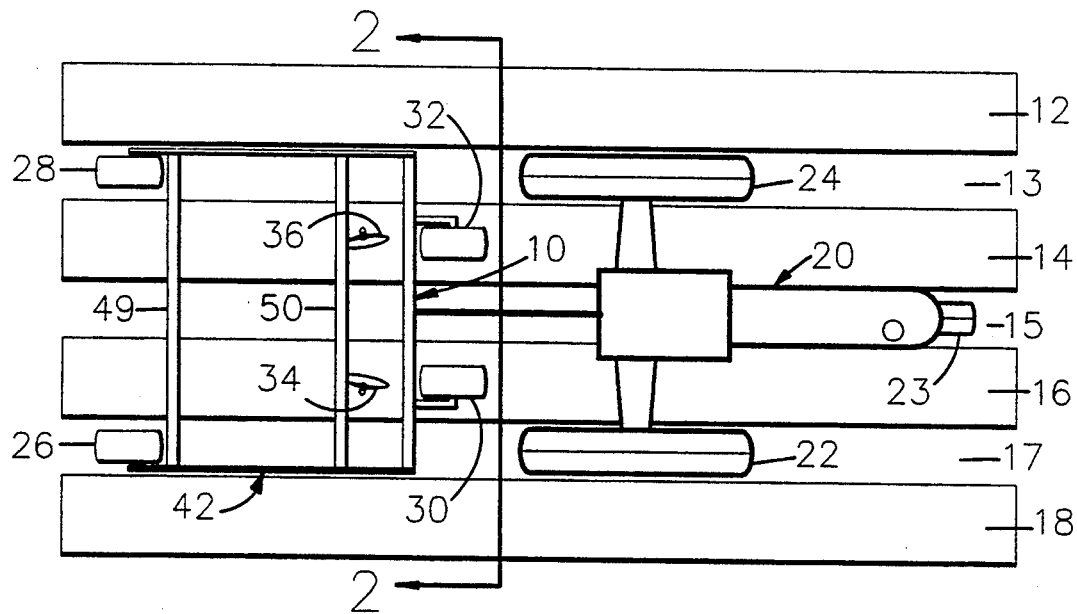
FIG. 1 is a top plan view showing the drip tape retrieving wagon of the present invention being towed by a tractor.
Figure 2:
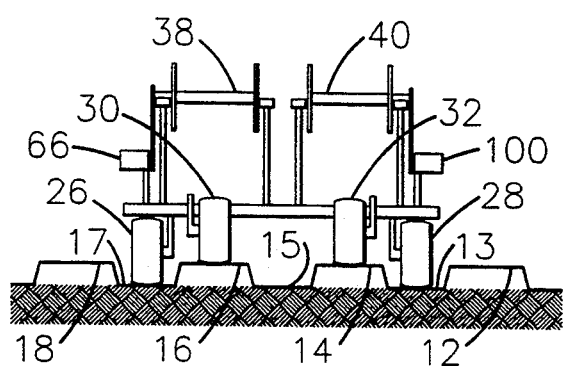
FIG. 2 is a front elevational view to the same scale as FIG. 1 in the direction 2—2 indicated in FIG. 1.

FIGS. 1 and 2 show the relation of the wheels of the tractor and of the drip tape retrieving wagon in relation to the plant beds and furrows. The drip tape retrieving wagon 10 is pulled by a tractor 20 in the elongated direction of the plant beds 12, 14, 16, and 18. The wheels 22 and 24 of the tractor ride in the furrows 13 and 17, while the front wheel 23 of the tractor moves along the furrow 15.

The right and left rear wheels 26 and 28 of the wagon 10 follow the right and left wheels 22 and 24 of the tractor 20 in the furrows 17 and 13 respectively. Note that the right and left front wheels 30 and 32 of the wagon 10 rest on top of the plant beds 16 and 14 respectively.

In FIG. 1, the cultivator discs 34 and 36 that are used for loosening the soil adjacent the drip tape are shown in their proper location immediately behind the front wheels 30 and 32 respectively.

In the exemplary embodiment shown in the drawings, two lines of drip tape are retrieved simultaneously; one line from the bed 16 and the other from the bed 14. These lines of drip tape are wound on the reels 38 and 40 respectively as the wagon 10 is pulled along. In a second preferred embodiment, four lines of drip tape are recovered simultaneously from the beds 12, 14, 16, and 18. In this second preferred embodiment, it has been found that two operators located on the wagon 10 can each manage two reels, so that in this second preferred embodiment, four reels of drip tape are wound simultaneously. The drip tape is retrieved and handled in the same manner as shown in FIGS. 3 and 4 regardless of how many lines of drip tape are retrieved simultaneously.

Figure 3:
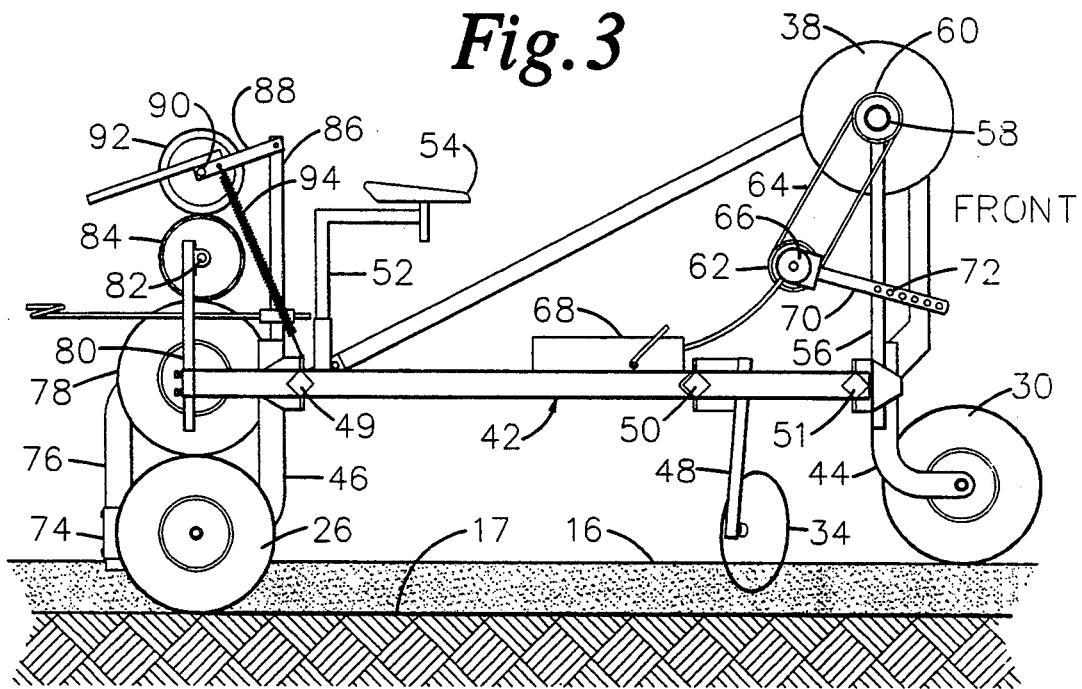
FIG. 3 is a right side elevational view showing a preferred embodiment of the present invention.
Figure 4:
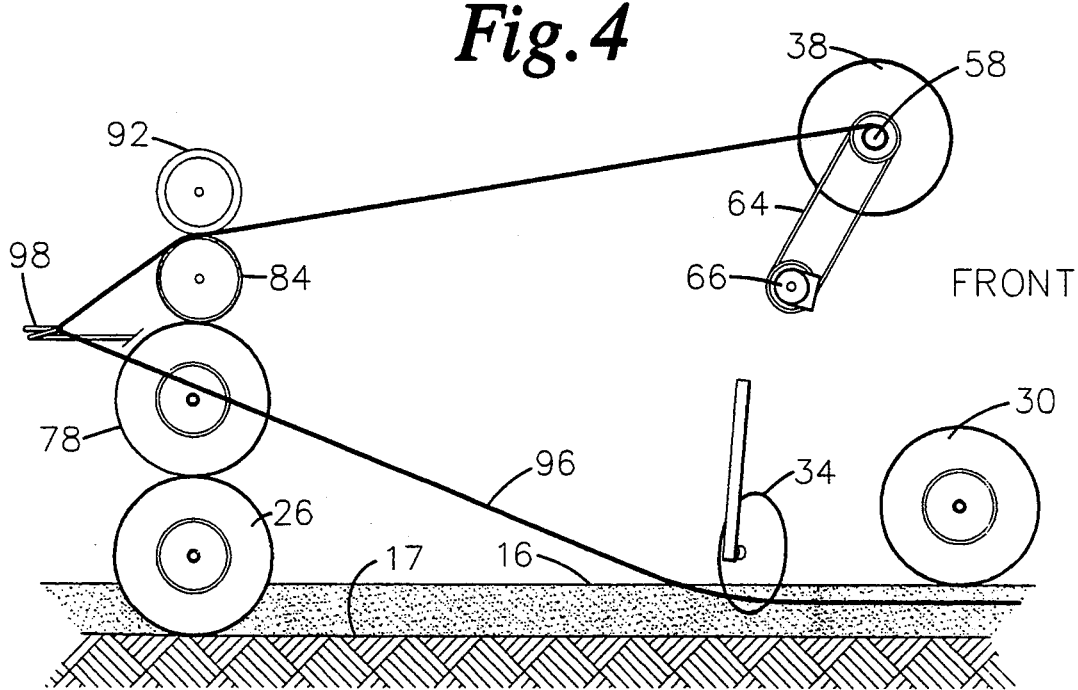
FIG. 4 is a diagram showing the path of the drip tape in the embodiment of FIG. 3; and, FIG. 5 is a hydraulic diagram showing the hydraulic system used in the preferred embodiment.

As best seen in FIG. 3, the wagon 10 includes a rectangular metal frame 42 to which the wheels 26 and 30 are attached by the arms 46 and 44 respectively. The cultivator disc 34 is attached to an arm 48 that is connected to a cross member 50. Also, an arm 52 supports a seat 54 for one of the operators.

An arm 56 extends upward from the cross member 51 to support an axle 58 on which the reel 38 is mounted for rotation. The reel 38 is attached to a pulley wheel 60 that is driven by a belt 64. The belt 64 is driven by a pulley wheel 62 that is connected to a hydraulic motor 66. The speed of the hydraulic motor 66 is controlled by the operator through the use of a foot-operated valve 68.

The hydraulic motor 66 is attached to an arm 70 that is pivotally connected to the arm 56, so that the weight of the hydraulic motor 66 keeps the belt 64 under tension. The amount of tension is purposely limited so that slippage of the belt 64 on the pulley wheels will occur before the drip tape breaks. A series of holes in the arm 70, of which the hole 72 is typical, permit adjustment of the belt tension.

A sleeve 74 attached to the rear end of the arm 46 permits the arm 76 to be adjusted vertically, and an intermediate wheel 78 is attached for rotation to the upper end of the arm 76.

An arm 80 is mounted for vertical adjustment to the frame 42, and an axle 82 on which the drum 84 turns is mounted to the upper end of the arm 80. The drum 84 extends horizontally across the entire width of the wagon.

Another arm 86 extends vertically from the cross member 49. Another arm 88 is pivotally connected to the arm 86 at one end of the arm 88. An axle 90 for a wringer wheel 92 is connected to the other end of the arm 88.

In this way the wringer wheel 92 bears against the drum 84 with a force that is determined by the tension spring 94. The purpose and operation of the intermediate wheel 78, the drum 84 and the wringer wheel 92 will be clarified in the following discussion of the path of the drip tape as shown in FIG. 4.

After being loosened from the bed 16 by the cultivator disc 34, the drip tape 96 passes rearwardly to the guide loop 98 attached to the wagon near a central rear portion of the wagon and then forwardly between the wringer wheel 92 and the drum 84, and then forwardly to be wound on the reel 38. A human operator guides the drip tape as it is being wound on the reel to distribute the tape evenly across the reel.

The sharp change of direction at the guide loop 98 is helpful in removing any soil and harvest debris that may be sticking to the outside of the drip tape. The squeezing of the tape between the wringer wheel 92 and the drum 84 is instrumental in removing any water that may remain in the drip tape.

Once the drip tape 96 has been freed from the bed 16, relatively little force is required to lift it onto the wagon, and this force is provided by the action of the drum 84 and the wringer wheel 92. If the circumferential speed of a point on the surface of the drum 84 were less than the groundspeed of the wagon 10, the drip tape would not be lifted fast enough, and would form a long loop extending behind the wagon on the ground. On the other hand, if the speed of a point on the surface of the drum 84 were appreciably greater than the groundspeed of the wagon, a tension would be applied to the drip tape, possibly sufficient to break it. The use of the intermediate wheel 78 and the drum 84 assures that the linear speed of a point on the surface of the drum 84 is approximately equal to the groundspeed of the wagon 10, and in the desired direction of rotation. In this way, the tape retrieving operation is independent of the groundspeed of the wagon 10, which may therefore be pulled by the tractor operator at whatever speed he deems appropriate for the prevailing conditions.

Figure 5:
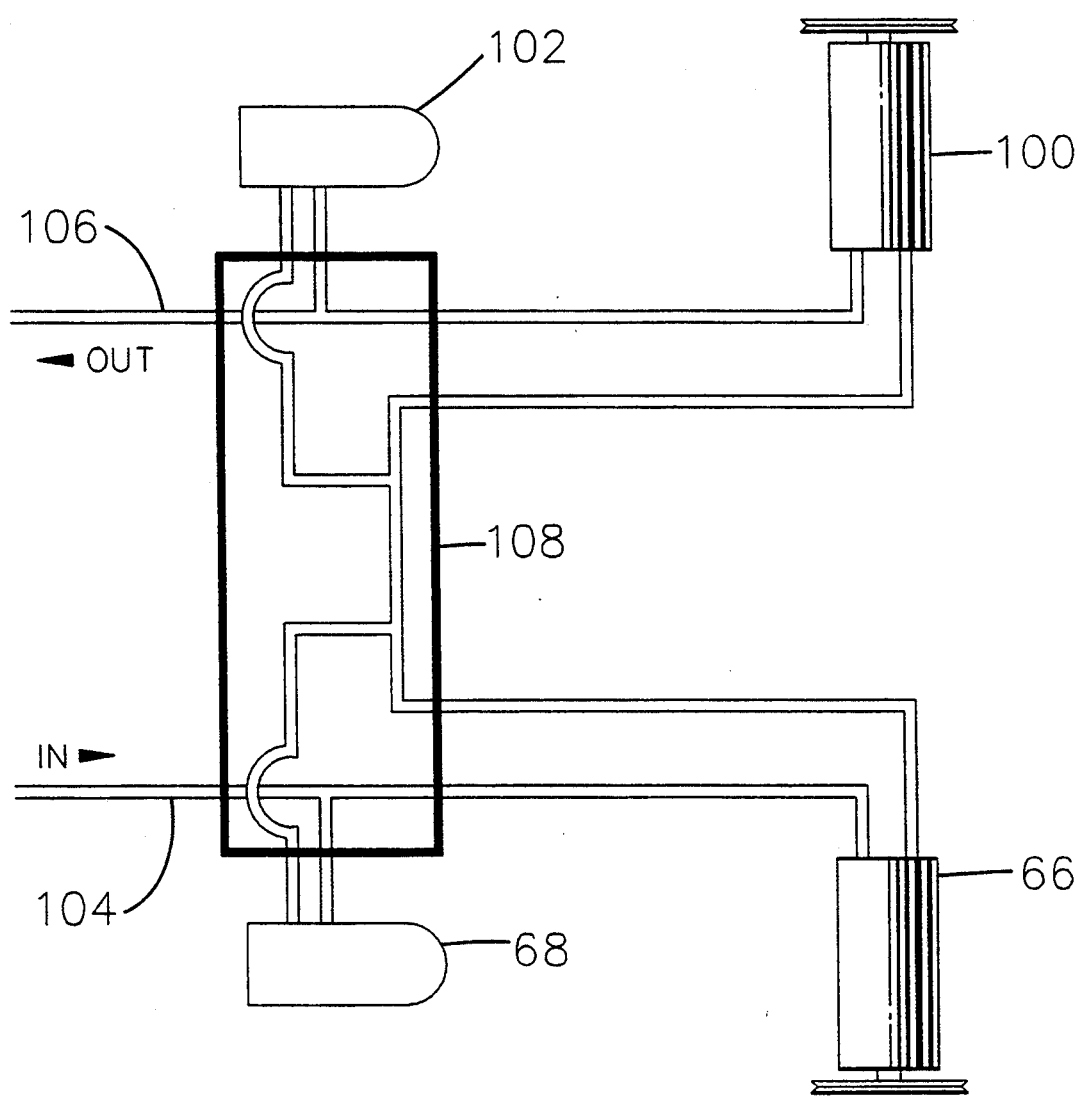

FIG. 5 shows the hydraulic system used in a preferred embodiment to control the speed of the hydraulic motors 66 and 100, which are used for turning the reels 38 and 40 respectively. Pressurized hydraulic fluid is supplied by the tractor 20 through the hose 104 and is returned to the tractor through the hose 106. As can be seen in FIG. 5, if both foot operated valves 68 and 102 are closed, the entire hydraulic input must pass through both motors 66 and 100. However, to the extent that the valve 68 is opened, some of the hydraulic fluid will pass through it thereby bypassing the motor 66, and the same obtains for the motor 100 and the valve 102. When the valves 68 and 102 are fully open, little if any hydraulic fluid passes through the motors 66 and 100, which therefore stop. For the sake of neatness, the interconnections between the various hydraulic lines are contained in a box 108 that is mounted on the wagon 10.

By use of the foot-operated valves 68 and 102, the operators onboard the wagon can control the speed of the reels 38 and 40 in relation to how full the reels are and how fast the drip tape is emerging from the roller 84. Overstressing of the tape is prevented by slippage of the belt 64 on the pulley wheels 60 and 62.

Thus, there has been described a drip tape retrieving wagon that not only frees the drip tape from the soil of the plant bed, but which also removes water and air from the drip tape and provides for the winding of the drip tape onto reels for storage and later reuse. In view of the enormous quantities of drip tape used in agriculture, the present invention should have a significant and highly beneficial impact on the ecology and should result in considerable savings in cost through reuse of the drip tape and reduction of disposal problems.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. Apparatus for retrieving drip tape that has been buried in the soil of an elongated bed, comprising in combination:

a wagon having ground-contacting wheels;

a cultivator disc attached to said wagon near the front of said wagon and extending down and into the soil of the bed to break up the soil to facilitate extraction of the drip tape from the soil;

a guide member attached to said wagon near a central rear portion of said wagon for altering the direction of the drip tape and for removing any soil and weeds that may be sticking to the drip tape;

a drum having a horizontal axis extending laterally across said wagon;

means for rotating said drum at such a speed that a point on the circumference of said drum moves at a linear speed approximately equal to the ground-speed of said wagon;

a wringer wheel having an axis parallel to the axis of said drum;

means for mounting said wringer wheel in rolling contact with said drum;

means for urging said wringer wheel against said drum;

a reel for receiving the drip tape after it has passed between said drum and said wringer wheel; and, drive means for rotating said reel at a speed controlled by an operator;

whereby, after being freed by said cultivator disc the drip tape is pulled upwardly and rearwardly through said guide member by said drum, and is passed between said wringer wheel and said drum to remove any water that might be inside the drip tape, and then the drip tape is drawn toward the front of said wagon where it is wound on said reel.

* * * * *